Nov. 27, 1962

W. MARKS 3,066,279

SONIC SHIP SPEED INDICATOR

Filed June 25, 1958

INVENTOR.
WILBUR MARKS

BY

ATTORNEYS.

Nov. 27, 1962  W. MARKS  3,066,279
SONIC SHIP SPEED INDICATOR
Filed June 25, 1958  2 Sheets-Sheet 2

INVENTOR.
WILBUR MARKS
BY
B. L. Zangwill
ATTORNEYS.

3,066,279
SONIC SHIP SPEED INDICATOR
Wilbur Marks, Rockville, Md., assignor to Oceanics, Inc., New York, N.Y., a corporation of Delaware
Filed June 25, 1958, Ser. No. 744,624
7 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

This invention relates to a sonic ship speed indicator and more particularly to a method of calculating the true speed for a ship relative to the bottom of the sea.

The invention consists of two echo Fathometers where one is mounted at the bow and the other at the stern which continuously measure and record the vertical distance from the ship to the sea bottom on a single chart. The time lag between the observation of the identical points on the ocean bottom by the fore and aft echo sounders is measured and divided into the known distance between the two instruments to obtain the true speed of the ship. In addition, a blanking means may be provided to eliminate any interference between the signals sent and received by the two Fathometers and an automatic computing circuit and speed indicator may be used if desirable.

In the past a number of systems have been designed to measure the true speed of a ship such as:

(1) Celestial body navigation systems (sun or stars) which require that the bodies be visible and clear. Fog and clouds may render such a technique useless. In addition, the calculations provide only the average speed of a ship over a 12 hour period.

(2) Speed versus power calibrations may be made of the ship but waves or rough weather will severely change these calibrations which are valid only in still water.

(3) Impeller log, flowmeter or paired electrode systems indicate the speed of the ship relative to its fluid environment but will not give the true speed if there are any currents or mass transport of water about the ship.

In order to overcome these disadvantages, it is the primary object of this invention to disclose a true speed indicator method and system usable under all conditions and at all times.

Another object of this invention is to disclose a true speed indicator system which may be used continuously for short and long distances, particularly during rapid maneuvering.

Another object of this invention is to disclose a method and apparatus using commercially available parts and equipment which will be inexpensive and easy to use, even by unskilled personnel.

Other objects and advantages of the invention will hereinafter become more fully apparent from the following description of the annexed drawings, which illustrate a preferred embodiment, and wherein.

Figure 1:
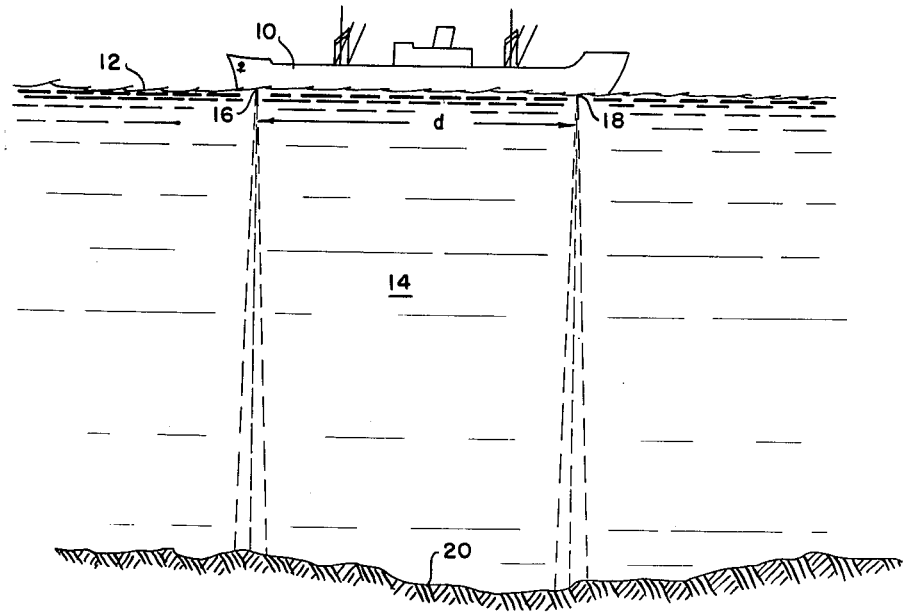
FIG. 1 is a pictorial view of the invention in operation on a ship.

Referring to the drawings, wherein like reference characters designate like or corresponding parts throughout the several views, there is shown in FIG. 1 (which illustrates a preferred embodiment) a ship 10 moving along the surface 12 of the sea 14. A Fathometer 16 is mounted on the bow of the ship and another Fathometer 18 is mounted near the stern.

Both Fathometers 16 and 18 transmit signals downwardly through the sea 14 to the sea bottom 20 and part of the reflected signal from each transmitter is received at its associated receiver. These signals may be in the form of supersonic sound waves of a particular frequency transmitted as short bursts or impulses having a number of cycles of the particular frequency at a desired repetition rate. A "sonic Depth and Height Indicator" such as disclosed by Bruno A. Wittkuhns et al. in Patent No. 2,131,993, patented October 4, 1938, may be used for the bow and stern Fathometers or any other suitable depth indicator may be used. However, continuous wave or other types of signals may be used provided that a continuous recording may be made.

Figure 2:
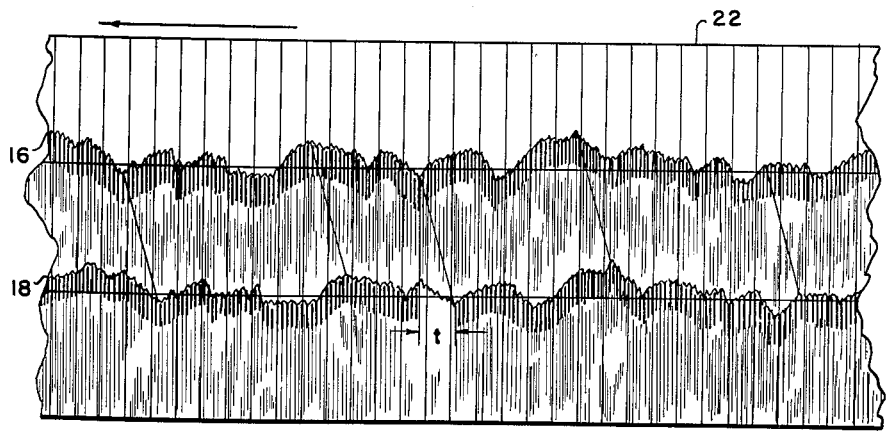
FIG. 2 is a typical curve of the depth recordings illustrating the method of measurement of speed.

The received waves are then recorded on a suitable dual channel, constant speed, recorder and FIG. 2 illustrates a typical recording 22 with depth plotted along the ordinate and time along the abscissa. These recordings, marked 16 and 18 to agree with Fathometers 16 and 18, will in general be identical plots of the sea bottom 20 as sounded by the ship but displaced by a time $t$.

The method basically consists in measuring the time $t$ between the two recordings of identical points on the sea bottom 20 and dividing it into the distance between the Fathometers 16 and 18 to compute the true speed of the ship relative to the bottom of the sea.

The measuring operation is most simply performed by hand because an operator's personal attention will guard against confusion between two points equidistant from the sea surface 12 but not located at the same point. As a practical matter the bottom of the sea, or ocean, or lakes, or channels appears to be continually changing in elevation from the viewpoint of a moving ship so that this possibility of confusion is generally very small.

Figure 3:
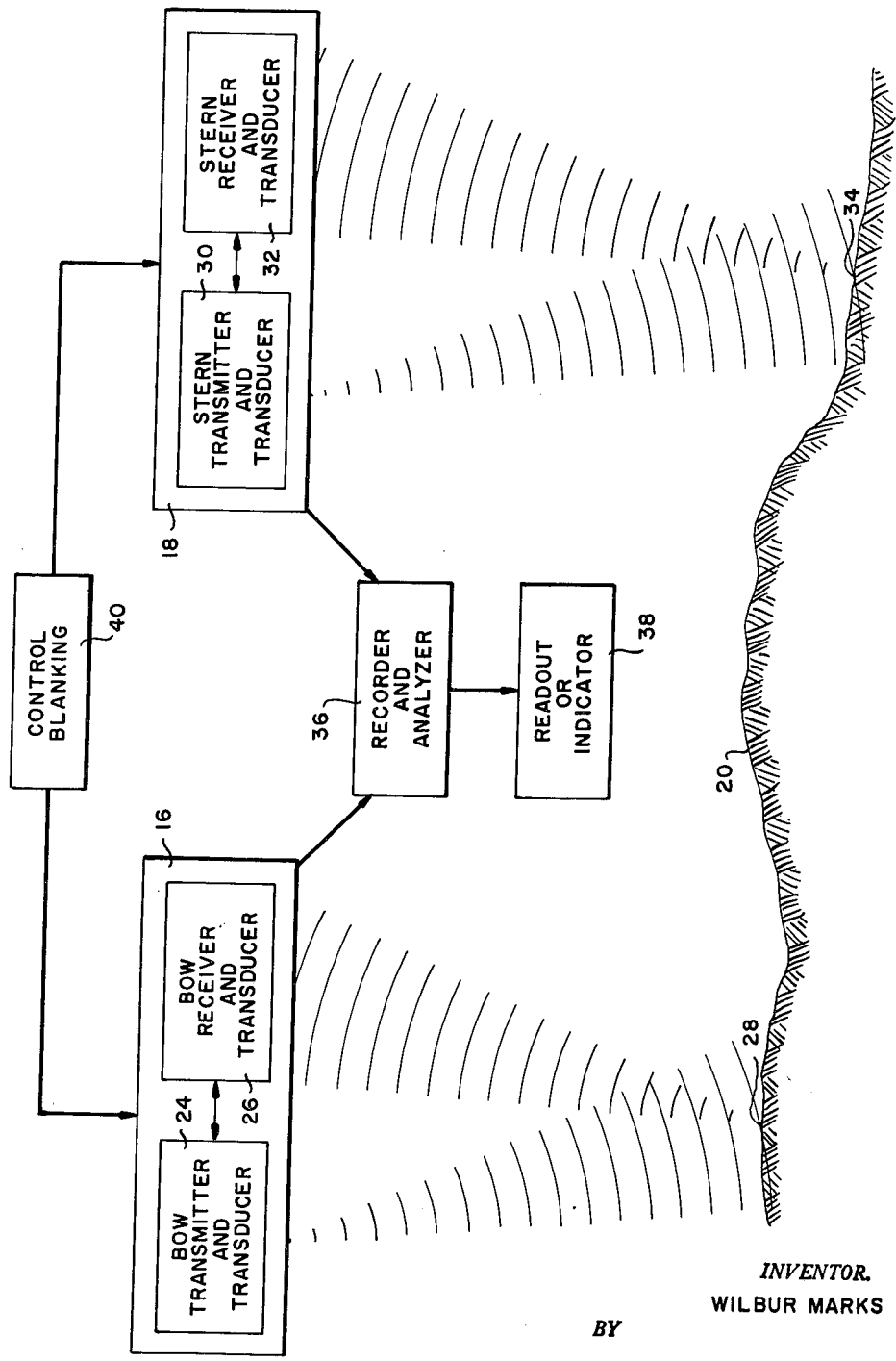
FIG. 3 is a block diagram of the apparatus.

Referring to FIG. 3, a block diagram of the apparatus is shown comprising bow transmitter and transducer 24, bow receiver and transducer 26 which measure the depth of a point 28 on the sea bottom 20, stern transmitter and transducer 30 and stern receiver and transducer 32 which measure the depth of a point 34 on the sea bottom 20, and a recorder and analyzer 36. A readout or indicator 38 may be used if the computation is done automatically.

The recorder 36 may be any suitable two channel recorder, such as a two channel, Brown Duplex Recorder, Series 153X27 made by Minneapolis--Honeywell Regulator Co., Philadelphia 44, Pa., but the speed computation may be done automatically. In that case the recorder 36 will include a memory device to remember the depth signal from bow fathometer 16 until the equivalent signal comes from the stern fathometer 18 whereupon this time difference is sent to readout or indicator 38 which may be calibrated to read the speed of the ship directly in knots.

Since the transmitted signal from the bow transmitter 24 may be received by the stern receiver 32 and create a false indication, a control blanking 40 may separate the signals by allowing the receivers to operate at certain specified times and to cut them off at other times if a pulse system is used. In a pulse system the transmitters, in addition to the receivers, may be alternately turned on and off. Alternatively the sonic transducers and receivers may be set on one frequency at the bow and on another frequency at the stern.

A continuous wave system may be employed where substantially different frequencies are used at the bow and the stern depth indicator to avoid a false indication.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A method of indicating the true speed of a ship relative to the sea bottom comprising transmitting and receiving first impulses vertically from a ship to said sea bottom at a first location on said ship, transmitting and receiving second impulses vertically from said ship to said sea bottom at a second location on said ship, recording said impulses, and measuring the time lag between impulses from said first and second locations having the same distance-representative waveform shape to give an indication proportional to the ship speed.

2. A method of measuring the speed of a ship over ground comprising the steps of measuring at a predetermined angle with respect to the transverse and longitudinal axes of said ship the distance from a first location on said ship to the ground by reflected sound waves measuring at said angle the distance from a second location on said ship to the ground by reflected sound waves, recording the distance measurements from said first and second locations to provide first and second continuously fluctuating waveforms, said second waveform being substantially identical in shape to said first waveform but delayed in relation thereto by an amount indicative of the speed of said ship, and comparing said waveforms to provide a measurement of the speed of said ship.

3. The method of claim 2 wherein said predetermined angle is at least approximately 90° from the longitudinal and transverse axes of said ship.

4. A method of measuring the speed of a ship over ground comprising the steps of transmitting at a predetermined angle with respect to the transverse and longitudinal ship axes sound waves from first and second longitudinally spaced locations on said ship to the ground, receiving at said first location return echoes from waves transmitted from said first location only and at said second station return echoes from waves transmitted from said second location only, blanking the receiving of waves at either of said locations at predetermined times to prevent interference between waves transmitted and received at both of said locations, continuously recording in separate channels the waves received at each of said locations respectively, said waveforms being substantially identical in shape and out of phase, the amount of phase difference being inherently an indication of the speed of said ship.

5. The method of claim 4 further comprising the step of comparing the two recorded wave forms to provide a measure of the speed of said ship.

6. The method of claim 4 wherein the separate channels of recorded waveforms are visible.

7. A method of measuring the speed of a ship over ground comprising the steps of transmitting at a predetermined angle with respect to the transverse and longitudinal ship axes sound waves from first and second longitudinally spaced locations on said ship to the ground, receiving at said first location return echoes from waves transmitted from said first location only and at said second station return echoes from waves transmitted from said second location only, recording in separate channels the waves received at each of said locations respectively, said waveforms being substantially identical in shape and out of phase, the amount of phase difference being inherently an indication of the speed of said ship.

References Cited in the file of this patent

UNITED STATES PATENTS

| | | |
|---|---|---|
| Re. 24,770 | Doyle et al. | Jan. 19, 1960 |
| 1,864,638 | Chilowsky | June 28, 1932 |
| 2,422,064 | Anderson | June 10, 1947 |
| 2,476,032 | Feldman et al. | July 12, 1949 |
| 2,568,926 | Moran | Sept. 25, 1951 |
| 2,772,479 | Doyle | Dec. 4, 1956 |
| 2,826,912 | Kritz | Mar. 18, 1958 |
| 2,878,711 | Blackstone | Mar. 24, 1959 |
| 2,878,712 | Blackstone et al. | Mar. 24, 1959 |
| 2,878,713 | Blackstone | Mar. 24, 1959 |
| 2,912,671 | Hayes | Nov. 10, 1959 |
| 2,918,581 | Wiley et al. | Dec. 22, 1959 |
| 2,967,449 | Weiss | Jan. 10, 1961 |
| 2,972,731 | Beebe | Feb. 21, 1961 |